United States Patent
Avery et al.

(10) Patent No.: US 8,789,904 B2
(45) Date of Patent: Jul. 29, 2014

(54) DIGITAL IMAGE PRINTING

(75) Inventors: Bernard Jzexoia Avery, Corvallis, OR (US); Grant K Garner, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 181 days.

(21) Appl. No.: 13/323,939

(22) Filed: Dec. 13, 2011

(65) Prior Publication Data
US 2013/0147866 A1   Jun. 13, 2013

(51) Int. Cl.
B41J 29/38   (2006.01)

(52) U.S. Cl.
USPC .................................... 347/5; 347/12

(58) Field of Classification Search
CPC ............. G06F 3/1297; G06K 15/1832; G06K 15/184; G06K 15/1865; H04N 1/41
USPC ............ 347/5–19, 40–43, 107; 358/1.8, 1.15, 358/1.16, 426.01
IPC ........................................................ B41J 29/38
See application file for complete search history.

(56) References Cited

U.S. PATENT DOCUMENTS

| | | | |
|---|---|---|---|
| 5,748,856 A | 5/1998 | Cariffe et al. | |
| 6,648,440 B2 | 11/2003 | Askeland et al. | |
| 7,350,892 B2 | 4/2008 | Vinas | |
| 7,628,466 B2 | 12/2009 | Cellura et al. | |
| 2005/0024402 A1* | 2/2005 | Quintana et al. | 347/12 |
| 2008/0117249 A1* | 5/2008 | Childers et al. | 347/19 |
| 2009/0033991 A1 | 2/2009 | Murashima | |
| 2010/0097652 A1* | 4/2010 | Silverbrook et al. | 358/1.15 |
| 2011/0228324 A1 | 9/2011 | Toyazaki | |

OTHER PUBLICATIONS

Chapter 13: Raster, Hewlett-Packard Confidential Version 6.0, A document describing methods of compression used for PCL files, May 1, 1995, 24 Pages.

* cited by examiner

*Primary Examiner* — Manish S Shah
*Assistant Examiner* — Roger W Pisha, II

(57) ABSTRACT

Printing of spatially-compressed digital image data using a single line of nozzles of a printhead having plural spaced-apart lines of nozzles to form a printed image without the spatial compression.

21 Claims, 6 Drawing Sheets

DIGITAL IMAGE PRINTING

BACKGROUND

Printers are frequently used to receive digital image data from an image source and then print that data on a print medium to form a printed image. The digital image data may represent a variety of types of information. Included among these types of information are text and barcodes.

DETAILED DESCRIPTION

Figure 1:
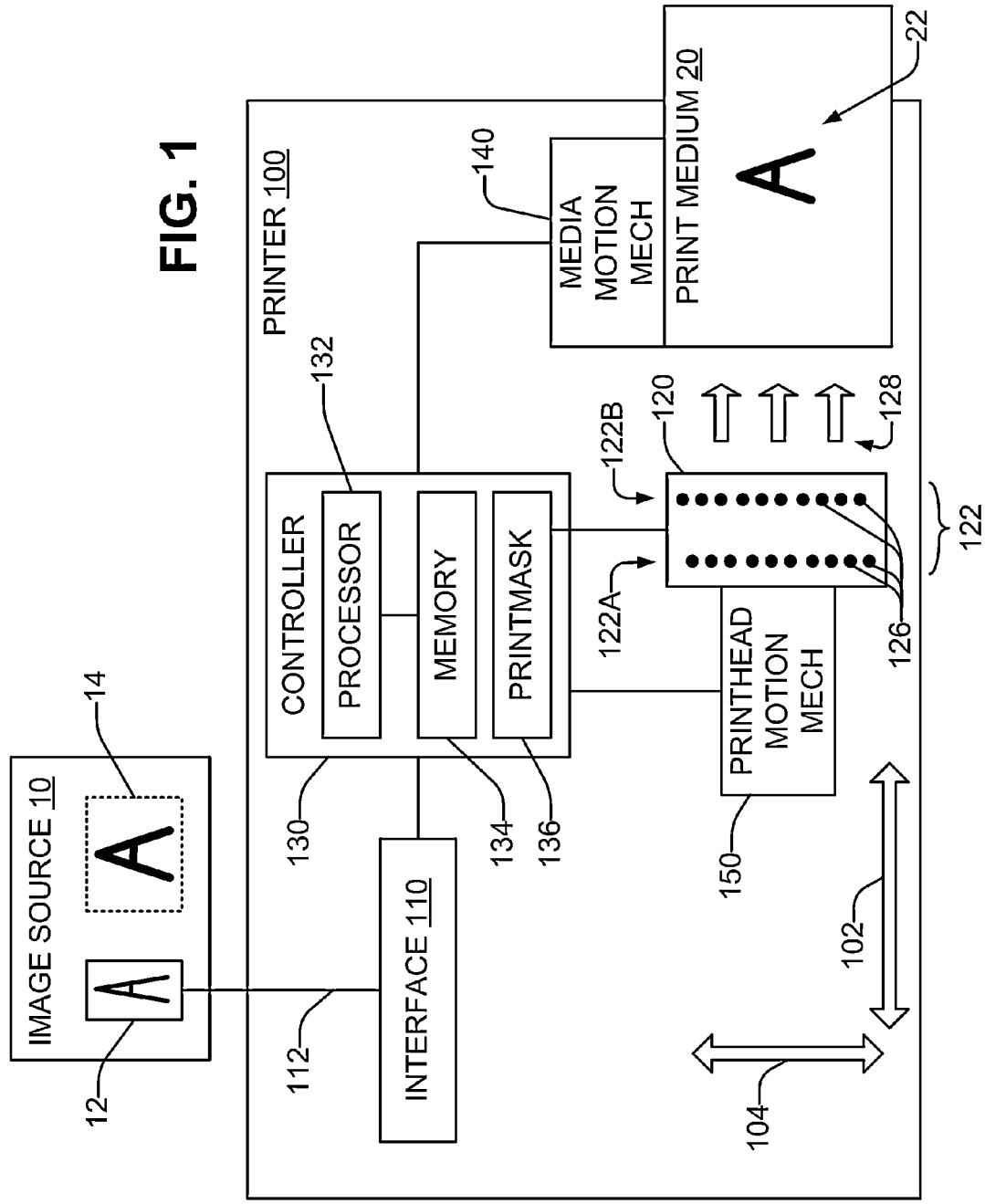
FIG. 1 is a schematic block diagram of a printer in accordance with an embodiment of the present disclosure.

As noted in the Background section, printers can receive digital image data from an image source and then print that data on a print medium to form a printed image. The image source transmits or sends the digital image data to the printer, which receives it via an interface. The interface communicates the received digital image data to a controller, and the operation of the interface may be orchestrated by the controller.

For a given image, the digital image data has a given size. The size of the image is directly proportional to the transmission time of the image data from the source to the printer. While it is desirable for the printer to print the image data as quickly as possible, in some printers the transmission time may be a significant or limiting factor as to the printer throughput. Thus, in some circumstances the image source may compress the digital image data to a smaller size in order to reduce the transmission time. However, with typical compression techniques, the printer performs a complementary decompression operation on the compressed digital data prior to printing. Some printers, such as for example lower-end printers having less expensive or less extensive processing resources (which in some printers includes a processor and memory), may have insufficient processing resources to decompress the compressed data quickly enough to provide any overall time savings, or may not be able to decompress it at all. Such printers could advantageously achieve higher throughput if the data could be printed without decompression. Other printers, such as for example web printers, print on a continuously flowing roll of media. Transmitting compressed digital image data to such a printer can reduce the transmission time, and if the data could be printed without decompression the speed of media flow past the printer could advantageously be increased, thus reducing the time, and thus the cost, to print a document such as a book or magazine.

Referring now to the drawings, there is illustrated examples of a printer, a method, and a computer-readable storage medium which print spatially-compressed digital image data to form printed output which corresponds to the digital image without the spatial compression. In other words, the printed output corresponds to the uncompressed digital image data before it was spatially compressed.

The printed output is formed on a print medium that may be any type of suitable sheet or roll material, such as paper, card stock, cloth or other fabric, transparencies, mylar, and the like, but for convenience the illustrated examples are described using paper as the print medium.

Considering now an example printer, and with reference to FIG. 1, a printer 100 has an interface 110 that receives digital image data 12 from an external image source 10 via a link 112. While the link 112 is illustrated as a wired connection, the link may alternatively be a wireless connection. The link 112 may provide a dedicated connection between the source 10 and the printer 100 such as, for example, a USB or a parallel port connection. Alternatively, the link 112 may correspond to a network connection established between the source 10 and the printer 100.

Relative to uncompressed digital image data 14, the digital image data 12 is spatially compressed in a direction 102 of relative motion between a printhead 120 and a print medium 20. The printhead 120 may be an inkjet printhead such as, for example, a thermal inkjet printhead, a piezo inkjet printhead, or other inkjet printer types. The printhead 120 has plural spaced-apart lines 122 of nozzles 126. While two spaced-apart lines 122A, 122B are illustrated in FIG. 1 for convenience, the printhead 120 may have more spaced-apart lines 122 such as, for example, four or more lines. The lines 122 extend linearly in a direction 104 that is orthogonal to the direction 102 of relative motion.

The nozzles 126 of both lines can controllably emit drops 128 of a same colorant for printing on the medium 20. As defined herein and in the appended claims, a "colorant" shall be broadly understood to mean a liquid fluid not composed primarily of a gas or gases and having a predetermined color.

Figure 3:
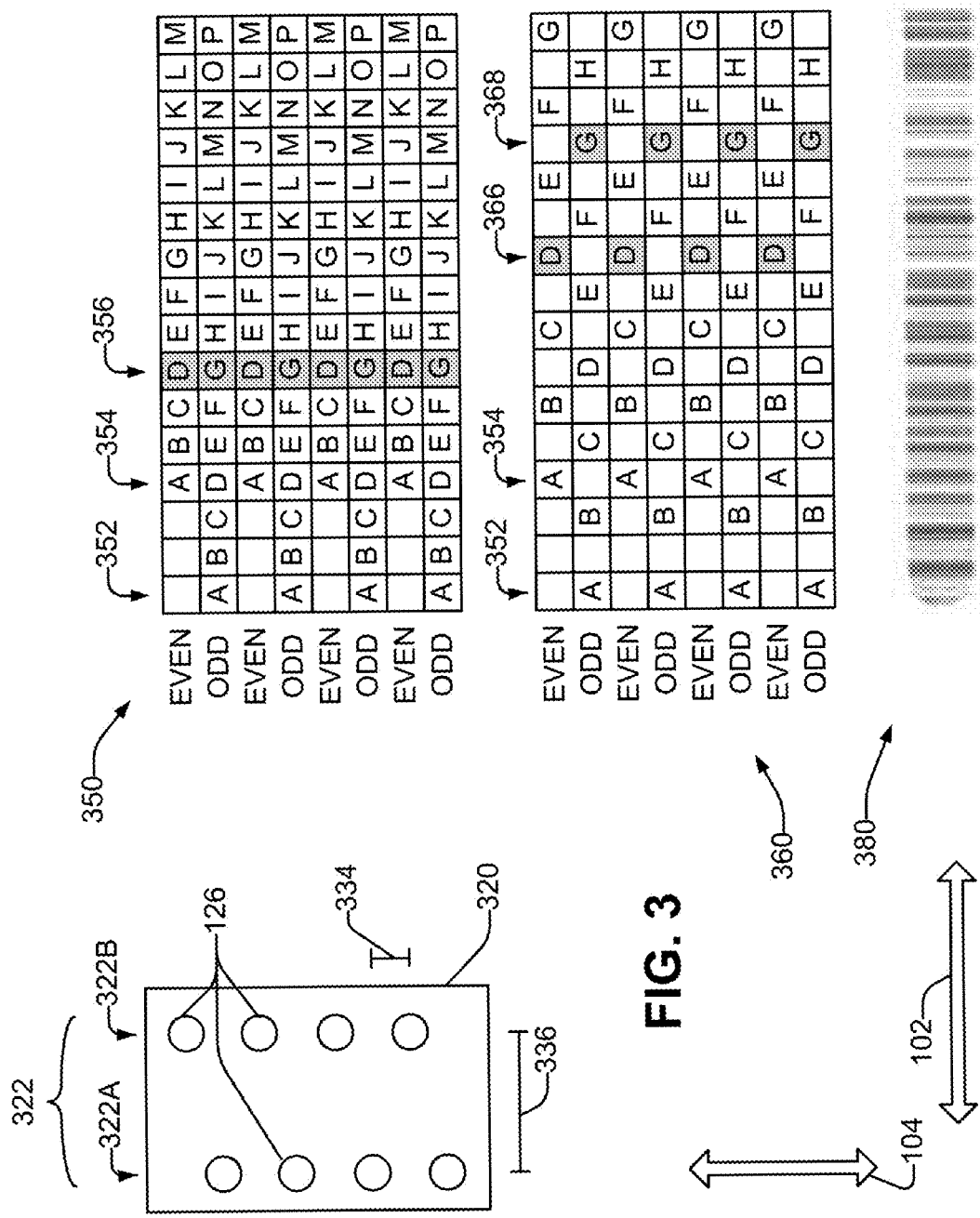
FIG. 3 is a schematic representation of printing example spatially compressed image data with plural lines of spaced-apart nozzles in a printhead, in accordance with an embodiment of the present disclosure.

The printer 100 also has a controller 130 that prints the compressed image data 12 using a single one of the lines 122 of nozzles 126 to form a printed image 22 on the medium 20 which corresponds to the digital image without the spatial compression (i.e. to the digital image that corresponds to uncompressed digital image data 14). The controller 130 does not decompress the compressed image data to form uncompressed image data prior to the printing. As will be explained subsequently in greater detail with reference to FIG. 3, printing the compressed image data 12 using more than a single one of the lines 122 of nozzles 126 does not form a printed image 22 that corresponds to the digital image without the spatial compression, but rather would result in a blurred or distorted image.

The spatial compression has a given ratio. For example, the digital image data 12 may be compressed by a ratio of 2:1, 4:1, or other ratios, including fractional ratios, in the direction 102 of relative motion, relative to the uncompressed digital image data 14. As a result, the compressed image data 12 is reduced in size substantially by the same ratio. As such, it can be transmitted from the image source 10 to the printer 100 in an amount of time that is substantially the inverse of the ratio. For example, digital image data 12 that is compressed in the direction 102 of relative motion by a ratio of 4:1 can be transmitted from the image source 10 to the printer 100 in substantially one-fourth the amount of time for transmitting the uncompressed digital image data 14.

In some examples, the controller 130 includes a processor 132 and a memory 134. The memory 134 is typically a computer-readable storage medium. In these examples, an executable program stored in the memory 134 may instruct the processor 132 to orchestrate the various operations performed by the controller 130.

In order to produce the relative motion, the printer 100 may include a media motion mechanism 140, a printhead motion mechanism 150, or both, which may be controllably operated by the controller 130. In some examples, the printhead may be held (temporarily or permanently) in a stationary or fixed position, and the medium 20 moved in the direction 102 of relative motion by the media motion mechanism 140. In some examples, the medium 20 may be held (temporarily or permanently) in a stationary or fixed position, and the printhead 120 moved in the direction 102 of relative motion by the printhead motion mechanism 150. In some examples, both the medium 20 and the printhead 120 may be moved, either at the same time or at different times.

The controller 130 processes the received compressed image data 12, and controls the operation of the nozzles 126, in accordance with the data 12 and the relative motion of the printhead 120 and the medium 20, to eject drops 128 of colorant to form the printed image 22. Typically, all of the nozzles 126 of all of the lines 122 of the printhead 120 are loaded with data indicating how many (i.e. zero to N) drops of the colorant are to be ejected in the next ejection event, and then a control signal ("firing signal") is supplied to all of the nozzles 126 of all of the lines 122 of the printhead 120 to cause the appropriate number of drops of the colorant to be ejected from each nozzle 126 at substantially the same time.

During a printing operation, the firing signal is typically issued to the printhead 120 at a "normal" firing frequency. The normal firing frequency is the frequency that, for a given speed of relative motion between the printhead 120 and the medium 20 in the direction 102, causes the colorant drops 128 ejected from the plural lines 122 of the nozzles 126 to generate a printed image in which the number of dots per inch ("dpi") printed on the medium 20 in the direction 102 corresponds to the number of pixels per inch in the direction 102 of the image data. It should be noted a "dot" may comprise one or more drops of the colorant deposited at substantially the same position on the medium 20.

Therefore, if the compressed image data 12 were to be printed at the normal firing frequency and the given speed of relative motion, the printed image would be similarly compressed in the direction 102. In other words, the printed image would look like the compressed depiction of the letter "A" of the compressed image data 12. If the uncompressed image data 14 were to be printed at the normal firing frequency and the given speed of relative motion, the printed image would be uncompressed. In other words, the printed image would look like the uncompressed depiction of the letter "A" of the uncompressed image data 14 (i.e. as printed image 22).

In some examples, the controller 130 prints the compressed image data 12, using a single one of the lines 122 of nozzles 126, at a firing frequency that is reduced relative to a normal firing frequency by the ratio. In such examples, the relative motion in the direction 102 is typically performed at a normal speed (velocity). The effect of reducing the firing frequency by the ratio while maintaining the relative motion at the normal velocity is to compensate for the image data compression during printing, without decompressing the compressed image data prior to the printing. By reducing the firing frequency by the same ratio that the image data was spatially compressed, the printed image 22 is spatially decompressed. Thus, the letter "A" of printed image 22 has the same appearance as the letter "A" of the uncompressed image data 14. By printing the compressed image data 12 using a single one of the lines 122 of nozzles 126, the printed image 22 does not exhibit the blurring or distortion that would result if multiple lines 122 of nozzles 126 were to be used to print the image at a reduced firing frequency and the normal velocity.

In other examples, the controller 130 increases the speed of the relative movement, in the direction 102, between the printhead 120 and the print medium 20 by the ratio. In such examples, the controller 130 typically prints the compressed image data 12, using a single one of the lines 122 of nozzles 126, at the normal firing frequency. The effect of increasing the speed of the relative motion while maintaining the normal firing frequency is to compensate for the image data compression during printing, without decompressing the compressed image data prior to the printing. By increasing the speed of relative movement by the same ratio that the image data was spatially compressed, the printed image 22 is spatially decompressed. Thus, the letter "A" of printed image 22 has the same appearance as the letter "A" of the uncompressed image data 14. By printing the compressed image data 12 using a single one of the lines 122 of nozzles 126, the printed image 22 does not exhibit the blurring or distortion that would result if multiple lines 122 of nozzles 126 were to be used to print the image at an increased velocity and the normal firing frequency.

In some examples, the controller 130 may use a printmask 136 to print the compressed image data 12 using a single one of the lines 122 of nozzles 126. The printmask 136 may, for example, mask out any data intended for nozzles 126 on the other lines 122, such that no drops of the colorant will be ejected from the nozzles 126 of the other lines 122 in response to the application of the firing signal to the printhead 120.

Figure 2:
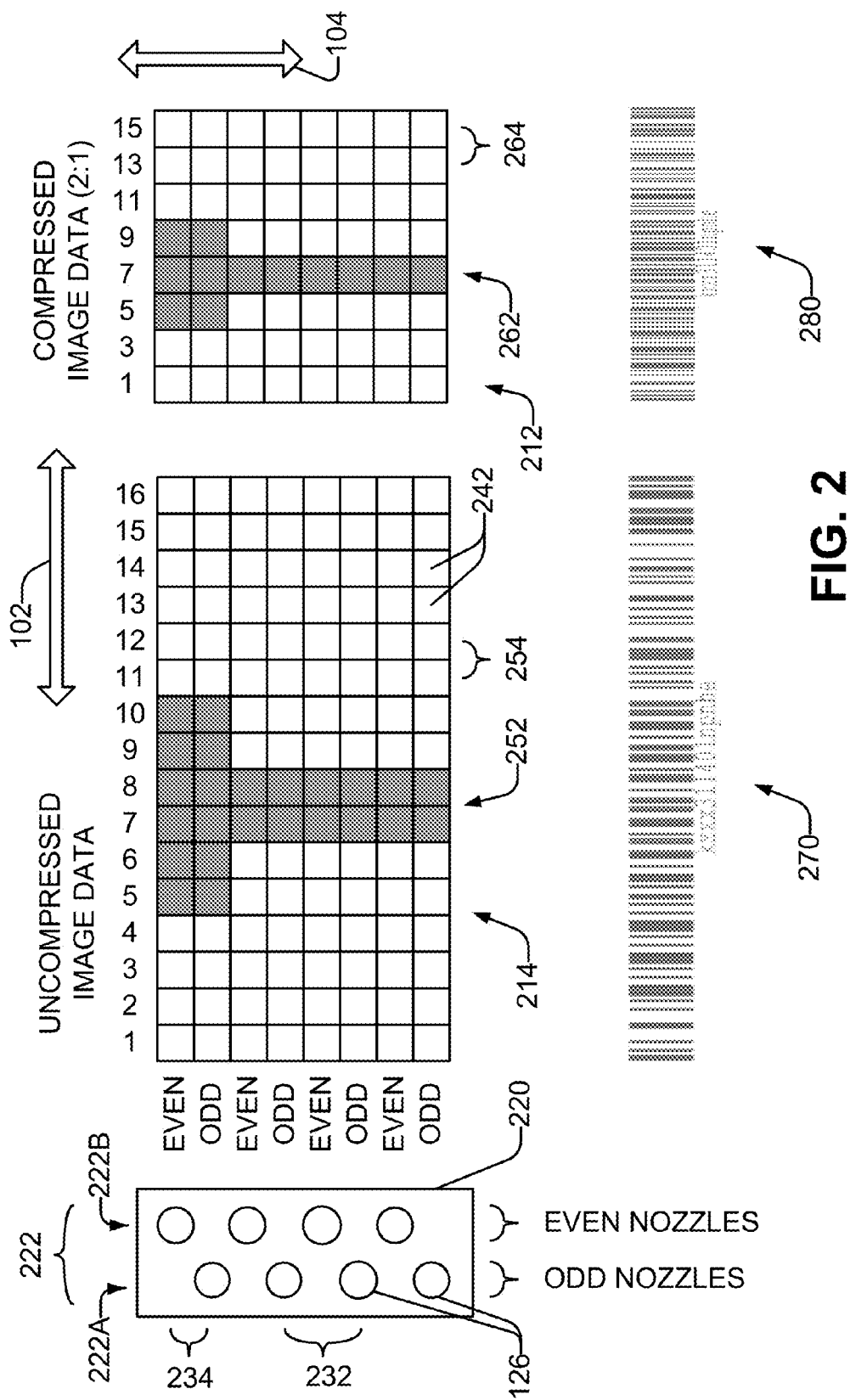
FIG. 2 is a schematic representation of example uncompressed image data, and example compressed image data printable on the printer of FIG. 1, in accordance with an embodiment of the present disclosure.

Considering now the printhead 120 in greater detail and in relation to uncompressed and compressed image data, and with reference to FIG. 2, an example printhead portion 220 has two lines 222A, 222B of nozzles 126. In each line 222, the nozzles 126 are typically equally spaced; and the spacing between nozzles 126 is substantially the same for all lines 222. In some printheads, the nozzles 126 in one line 222A may be fractionally offset, in the direction 104, from the position of the nozzles 126 in another line 222B, an effect typically referred to as "staggered nozzles". This has the effect of multiplying the number of dots per inch that can be deposited in the direction 104. For example, the nozzles 126 in each column 222 may be spaced at a spacing 232 of $\frac{1}{600}^{th}$ inch, which is equivalent to a nozzle density of 600 nozzles per inch ("npi"). However, the nozzles 126 in line 222B are offset in the direction 104 by a spacing 234 that is one-half of the nozzle spacing (i.e. $\frac{1}{1200}^{th}$ inch) from the nozzles 126 in line 222A. Thus the nozzles of both columns 222A, 222B are capable, during printing, of producing dots along the direction 104 at a collective density of 1200 dpi by interleaving dots from line 222A with dots from line 222B. For convenience of discussion, line 222A will be considered as defining odd-numbers nozzles, while line 222B will be considered as defining even-number nozzles.

While printhead portion 220 illustrates two lines 222, other printheads may have a greater number of lines. For example, another printhead may have four lines of nozzles, each line offset from another line in the direction 104 by one-fourth of the nozzle spacing. Thus for the spacing 232 of $\frac{1}{600}^{th}$ inch, the four lines of nozzles would be capable, during printing, of producing dots along the direction 104 at a collective density of 2400 dpi by analogously interleaving dots from all four lines 222.

Considering now, with continued reference to FIG. 2, example uncompressed image data 214, a portion of the image data corresponding to the nozzles 126 of lines 222A, 222B is illustrated as square pixels (such as pixels 242) in a row-and-column format. Each row of the image data 214 is printed by a different one of the nozzles 126 during the relative motion in the direction 102 between the printhead 120 and the print medium 20. A sixteen column portion of the image data 214 is illustrated. The shaded pixels have pixel values that indicate that the corresponding nozzle 126 should emit colorant at the corresponding time of relative motion, while no colorant should be emitted for the white pixels. It can be observed that the shaded (printed) pixels form a simplified letter "T" 252. The columns of the image data 214 have a spacing 254 in the direction 102. The spacing 254 may correspond to, for example, 1200 pixels per inch ("ppi").

The normal firing frequency for the printhead 220 may calculated as the speed of relative motion (e.g. in inches per second, or "ips") in the direction 102, multiplied by the number of dots per inch to be printed by the printhead in the direction 102. Assume that the normal velocity of relative motion is 6 inches/second. Then to print the 1200 ppi image data on the medium 20 at 1200 dpi, the printhead firing frequency can be determined as:

(6 inches/second)×(1200 dots/inch)=7200 dots/second=7.2 kHz

Printing the compressed image data 212 at the normal 7.2 kHz firing frequency and the normal 6 ips speed of relative motion will result in printed output that shows the letter "T" with the proper 1:1 aspect ratio.

Now, consider example spatially-compressed image data 212, which may be generated from uncompressed image data 214. One simple way to spatially compress the data in the direction 102 by a 2:1 ratio is by decimating the image data to remove every other column of pixels. For example, the even-numbered pixel columns of uncompressed image data 214 have been removed from compressed image data 212, leaving the odd-numbered pixel columns. The compressed image data 212 has eight columns of pixels, or one-half of the sixteen columns in the uncompressed image data 214, and is one-half the size of the uncompressed image data 214. As a result, the compressed image data 212 can be transmitted from the image source 10 to the printer 100 in substantially one-half the time to transmit the uncompressed image data 214.

It can be observed in the compressed image data 212 that the shaded (printed) pixels form a letter "T" 262 which is spatially-compressed in the direction 102 relative to the letter "T" 252. The columns of the compressed image data 212 have a spacing 264 in the direction 102. Where the spacing 254 corresponds to 1200 ppi, the spacing 264 corresponds to 600 ppi as a result of the 2:1 compression. Printing the compressed image data 212 at the normal 7.2 kHz firing frequency and the normal 6 ips speed of relative motion will result in printed output that shows the letter "T" with the compressed 2:1 aspect ratio.

An example of an uncompressed barcode and uncompressed text 270 is also illustrated. The compressed barcode and compressed text 280 illustrate the result of decimating the uncompressed barcode and uncompressed text 270 to spatially-compress it by a ratio of 2:1. The resulting barcode may not be scannable, and the text may not be humanly readable, when printed in the compressed form 280. Higher compression ratios, such as 4:1 or greater, exacerbate these concerns.

As has been discussed heretofore, the spatially compressed image data can be printed on the medium to form a printed image which corresponds to the digital image without the spatial compression by either decreasing the firing frequency by the same ratio that the image data was spatially compressed, or by increasing the speed of relative movement by the same ratio that the image data was spatially compressed. However, and with reference to FIG. 3, printing the compressed image data using plural lines of the spaced-apart lines of nozzles to emit the colorant may produce unsatisfactory results.

Consider a printhead 320 having two lines of nozzles 126. The nozzles in each line 322 are substantially equally spaced by substantially the same spacing, and are fractionally offset or staggered between columns 322A-322B. As a result, the spacing 334 is one-half of the spacing between nozzles in a single line 322. The nozzles of line 322A are considered the odd nozzles, and the nozzles of line 322B are considered the even nozzles. Also as has been discussed heretofore, a firing signal is supplied to all of the nozzles of all of the lines 322 of the printhead 320 to cause the individually specified number of drops of the colorant to be ejected from each nozzle 126 at substantially the same time.

The printhead 320 also has an inter-line spacing 336 in the direction 102 between the lines 322A-322B. Typically this spacing 336 is much larger than the spacing 334 in the direction 104. In some printheads, the spacing 336 may be at least 10 times greater than the spacing 334. As a result, when a firing signal is applied to the printhead 320, a corresponding spacing occurs on the medium 20 in the placement of drops emitted from the nozzles of line 322A and drops emitted from the nozzles of line 322B.

Consider now example printed output 350 on a print medium produced by the printhead 320 in response to firing signals applied at the normal firing frequency, and relative motion between the printhead 320 and the medium occurring at the normal velocity. Furthermore, for convenience of illustration, assume that the spacing 336 in the direction 102 is three times ("3×") the spacing 334 in the direction 104. Each letter in the alphabetic sequence "A" through "P" represents the issuance of a firing signal to the printhead 320, and the position in the printed output 350 indicates the position on the medium in which drops from each of the nozzles 126 would be placed in response to each firing signal. For the first firing signal "A", due to the spacing 336, drops from the odd nozzles are placed in a first column 352, while drops from the even nozzles are placed in a fourth column 354 (the first column is the left-most column in printed output 350). The relative motion at the normal velocity in the direction 104 causes the successive firing signals "B", "C", "D", etc., to each be offset one column from each other in the printed output 350. Assume that the shaded column 356 represents a vertical line printed on the printed output 350. It can be appreciated that, due to the spacing 336 in the direction 102, the line of column 356 is formed by drops emitted from the even nozzles during firing signal "D" and drops emitted from the odd nozzles during firing signal "G".

Now, consider example printed output 360 that illustrates the effect of either decreasing the firing frequency by a 2:1 ratio, or increasing the speed of relative movement by a 2:1 ratio, as might be done to attempt to print spatially compressed image data on the medium without the spatial compression using all lines 322A, 322B of nozzles 126. For the first firing signal "A", due to the spacing 336, drops from the odd nozzles are placed in a first column 352, while drops from the even nozzles are placed in a fourth column 354. However, due to the 2:1 decreased firing frequency or the 2:1 increased speed of relative motion, the output generated by the successive firing signals "B", "C", "D", etc., are each offset two columns, rather than one column, from each other in the printed output 350. As a result, the drops emitted from the even nozzles during firing signal "D" and the drops emitted from the odd nozzles during firing signal "G" do not form the desired vertical line. The drops resulting from firing signal "D" are placed in column 366, while the drops resulting from firing signal "G" are placed in column 368. This has the effect of undesirably blurring and/or distorting the printed output.

The printed output 380 illustrates the result of printing the 2:1 compressed text 280 (FIG. 2) at the 2:1 decreased firing frequency, or the 2:1 increased speed of relative motion. The lines of the barcode are blurred and distorted. The resulting printed barcode is unlikely to be properly scannable. If text were included, the text would be similarly unlikely to be humanly readable, when multiple columns of the printhead 320 are used to print the output.

Figure 4:
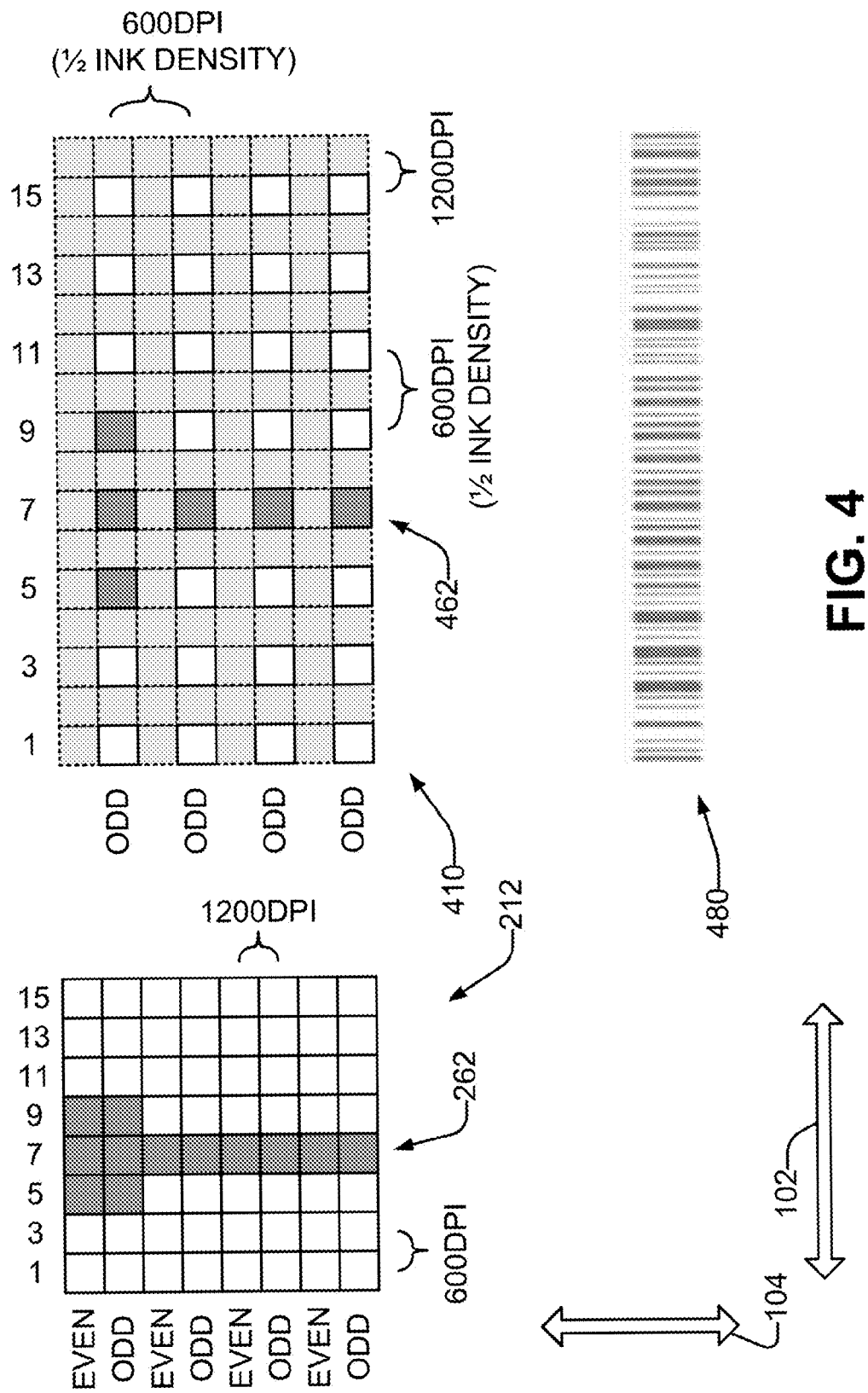
FIG. 4 is a schematic representation of printing example spatially compressed image data with a single line of nozzles in a printhead having plural lines of spaced-apart nozzles, in accordance with an embodiment of the present disclosure.

Considering now the printing of the spatially compressed image data 212 (FIG. 2) on a medium to form a printed image which corresponds to the digital image 214 without the spatial compression, and with reference to FIG. 4, the image is printed using a single line of nozzles 126 in a printhead to emit the colorant while either decreasing the firing frequency by the same ratio that the image data was spatially compressed, or by increasing the speed of relative movement by the same ratio that the image data was spatially compressed. With regard to the printhead 320, any single line of nozzles may be utilized; as an example, FIG. 4 illustrates printed output generated by use of the line 322A of odd nozzles 126. A printmask 136 (FIG. 1) as described heretofore may be used to inhibit the ejection of drops of colorant by the nozzles 126 of even line 322B.

Example printed output 410 illustrates the results of printing the spatially compressed image data 212 using the single line 322A of odd nozzles 126 while either decreasing the firing frequency by the same ratio that the image data was spatially compressed, or by increasing the speed of relative movement by the same ratio that the image data was spatially compressed. The layout of the printed output 410 corresponds to the row-and-column arrangement of the uncompressed image data 214. The gray background dot positions correspond both to decimated (even-number) columns of the uncompressed image data 214, and to rows of the image data that are not printed because they corresponds to the nozzles 126 of line 322B (i.e. the even nozzles). Each dark- or light-colored dot position of the printed output 410 corresponds to the pixels of the spatially-compressed image data 212 that are printed using the nozzles 126 of line 322A (i.e. the odd nozzles).

It can be appreciated that the letter "T" 462 is formed by the dark colored dot positions of the printed output 410. Because of the decreased firing frequency or the increased relative motion speed, the letter "T" 462 is printed in an uncompressed manner, relative to the compressed letter "T" 262 of the compressed image data 212. Thus the printed output 410 that results from printing the spatially compressed image data 212 is not spatially compressed.

The printed output 480 illustrates the result of printing the 2:1 compressed text 280 (FIG. 2) at the 2:1 decreased firing frequency, or the 2:1 increased speed of relative motion using a single one of the lines 322 of nozzles 126. The lines of the barcode 480 are accurately aligned, not blurred or distorted as are those of the barcode 380 printed with both of the lines 322.

The resulting printed barcode 480 is properly scannable. If text were included, the text would also be humanly readable.

It can also be appreciated that the image density of the printed output 410 is reduced relative to the pixel density of the original uncompressed image data 214. The image density is reduced 2:1 in the direction of relative motion 102 as a result of the decimation that generates the compressed image data 212 from the uncompressed image data 214. The image density is also reduced 2:1 in the direction 104 as the result of printing with one of the two lines 322 of nozzles 126. Thus a 2:1 spatial compression of image data, printed with one line 322 of nozzles 126 of a printhead 320 having two such lines 322, results in an overall printed image density that is one-fourth of that of the original uncompressed image data 214, as can be appreciated from the printed output 410. A higher data compression ratio, or printing with a printed having more lines 322, would result in a lower printed image density. For example, if the spatial compression were to be increased to 4:1, the overall printed image density would be one-eighth of that of the original uncompressed image data 214. If the 4:1 spatially-compressed image were to be printed a single line of nozzles in a printhead having four such lines, the overall printed image density would be one-sixteenth of that of the original uncompressed image data 214.

At some point, the reduction in printed image density may become such that the printed image is too light or otherwise unsatisfactory. However, in many applications the printed image density achieved by the present disclosure is quite satisfactory. For example, a colorant-saving "draft mode" may be implemented in this manner having fast print output that results from the reduced size of the transferred image data and in some examples by the increased speed of relative motion. In addition, many printers have sufficient resolution to print photographs or other images with high image quality. For many other types of information, such as barcodes or text, however, such high resolution is overkill; legibility rather than the highest possible image quality is often the criterion by which the printed output is assessed. Although for simplicity of illustration, the letter "T" 462 in printed output 410 is illustrated as being formed by a 5×7 cell matrix, in many printers a larger matrix is used and thus more each letter will be formed by more than the 6 colorant dots illustrated. In addition, interaction effects between the colorant and the print medium typically occur and reduce the size of the unprinted area ("white space") between dots. In some examples, for a printhead 320 with two lines 322 of nozzles 126, a 4:1 spatial compression of the image data produces printed output with the desired legibility. Thus using the techniques of the present disclosure to print such materials can increase printer throughput and lower colorant usage.

Figure 5:
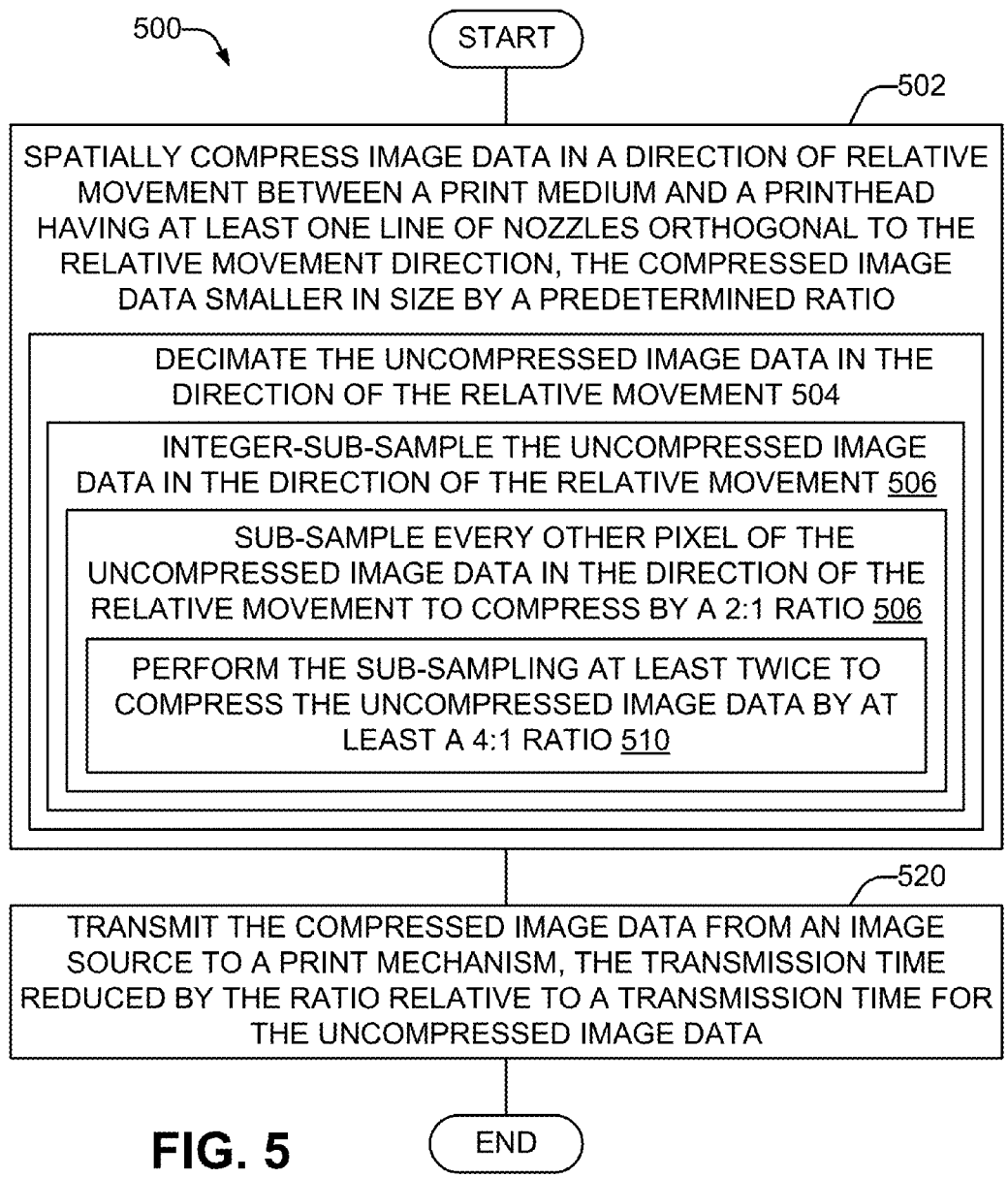
FIG. 5 is a flowchart according to an embodiment of the present disclosure of a method of spatially compressing digital image data.

Another example of the present disclosure is a method of printing a digital image. The digital image may be printed from digital image data that has been spatially compressed. Considering now, and with reference to FIG. 5, the spatial compression of digital image data, one method 500 for compressing the data begins at 502 by spatially compressing image data in a direction of relative movement between a print medium and a printhead having at least one line of nozzles orthogonal to the relative movement direction, the compressed image data smaller in size than the uncompressed data by a predetermined ratio. In some examples, the compressed image data is formed at 504 by decimating the uncompressed image data in the direction of the relative movement. In some examples, the decimating 504 includes, at 506, integer-sub-sampling the uncompressed image data in the direction of the relative movement. In some examples, the sub-sampling 506 includes, at 508, sub-sampling every other pixel of the uncompressed image data in the direction of the relative movement to compress by a 2:1 ratio. In some examples, the sub-sampling of every other pixel 508 includes, at 510, performing the sub-sampling at least twice to compress the uncompressed image data by at least a 4:1 ratio. At 520, the compressed image data is transmitted to a print mechanism. The transmission to the print mechanism typically occurs from an image source external to the print mechanism. The transmission time is reduced by the ratio relative to a transmission time for the uncompressed image data.

Figure 6:
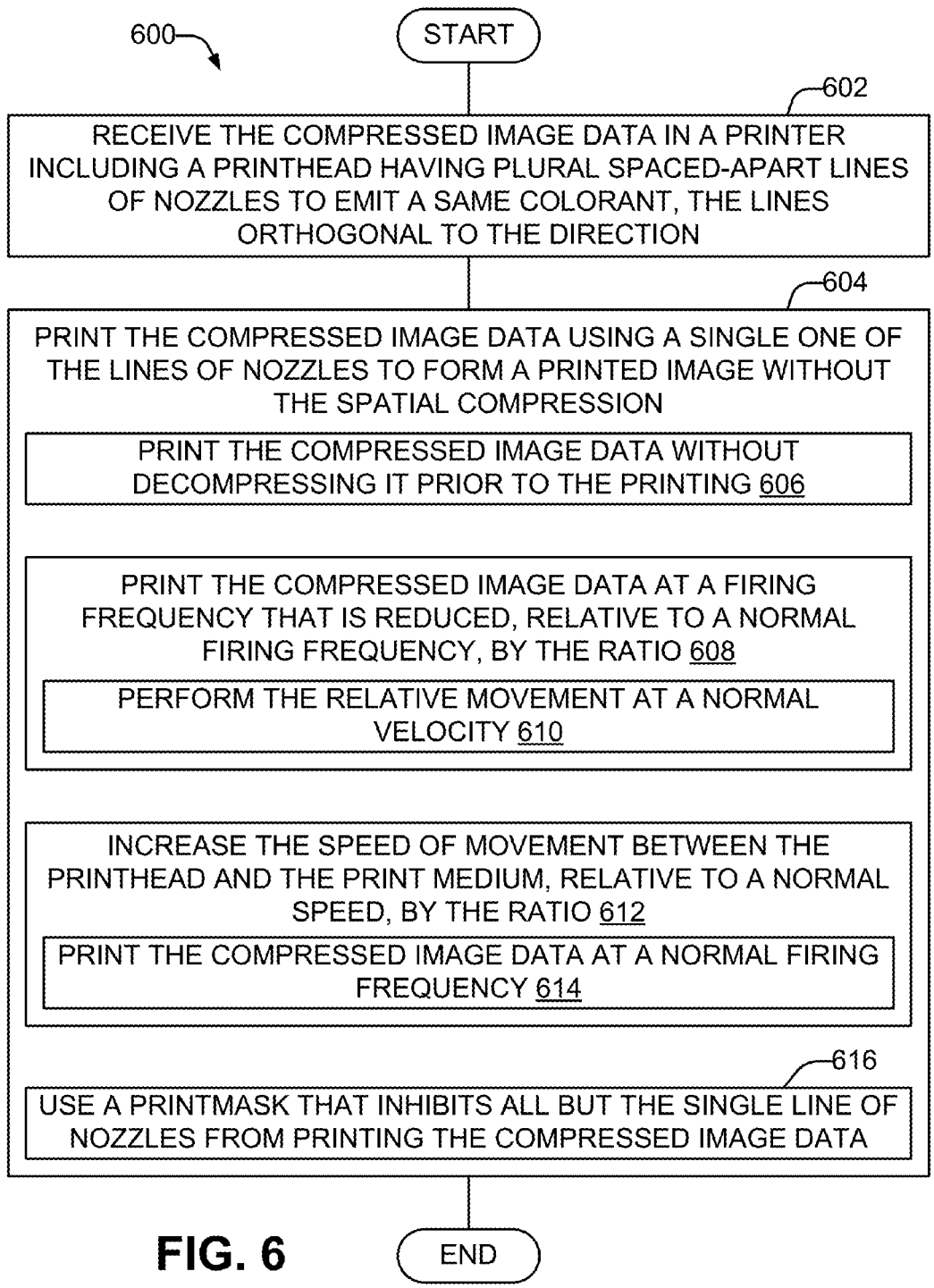
FIG. 6 is a flowchart according to an embodiment of the present disclosure of a method of printing the spatially-compressed image data of FIG. 5 with the printer of FIG. 1 using the single line of nozzles in the printhead of FIG. 4.

Consider now, with reference to FIG. 6, a method 600 of printing a digital image. The digital image may be printed from the spatially-compressed digital image data generated by the method 500. In some examples, the method 600 may be considered as steps in a method implemented in the controller 130 via the processor 132 according to instructions of an executable program stored in the memory 134. In some examples, the flowchart of FIG. 6 may be considered as steps in a method implemented in the printer 100.

The method 600 begins at 602 by receiving the compressed image data at a printer including a printhead having plural spaced-apart lines of nozzles to emit a same colorant, the lines orthogonal to the direction of relative movement between a print medium and the printhead. At 604, the compressed image data is printed using a single one of the lines of nozzles to form a printed image without the spatial compression. Typically, at 606, the compressed image data is printed without decompressing the compressed image data prior to the printing 604.

In some examples the printing 604 includes, at 608, printing the compressed image data at a firing frequency that is reduced, relative to a normal firing frequency, by the ratio. In such examples, at 610, the relative movement is typically performed at a normal velocity, as has been defined heretofore.

In other examples the printing 604 includes, at 612, increasing the speed of movement between the printhead and the print medium, relative to a normal speed, by the ratio. In such examples, at 614, the compressed image data is printed at a normal firing frequency, as has been defined heretofore.

In some examples, the printing 604 includes, at 616, using a printmask to inhibit all other lines of nozzles, except the single line of nozzles, from printing the compressed image data, From the foregoing it will be appreciated that the apparatuses, articles of manufacture, and methods provided by the present disclosure represent a significant advance in the art. Although several specific examples have been described and illustrated, the disclosure is not limited to the specific methods, forms, or arrangements of parts so described and illustrated. Terms of orientation and relative position (such as "top," "bottom," "side," "row", "column", and the like) are not intended to require a particular orientation of any element or assembly, and are used only for convenience of illustration and description. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of printing a digital image, comprising:
   receiving compressed image data having spatial compression, relative to corresponding uncompressed image data, in a direction of relative movement between a print medium and a printhead, the printhead having plural spaced-apart lines of nozzles to emit a same colorant, the lines orthogonal to the direction; and
   printing the compressed image data using a single one of the lines of nozzles to form a printed image without the spatial compression.

2. The method of claim 1, wherein the spatial compression has a given compression ratio between compressed and uncompressed image data, and wherein the compressed image data is smaller than the uncompressed image data by the ratio, the method comprising:
   transmitting the compressed image data from an image source to a print mechanism having the printhead, wherein the transmission time is reduced relative to a transmission time for the uncompressed image data by the ratio.

3. The method of claim 1, wherein the spatial compression has a given ratio between compressed and uncompressed image data, and wherein the printing comprises:
   printing the compressed image data at a firing frequency that is reduced relative to an uncompressed image data firing frequency by the ratio.

4. The method of claim 3, wherein the printing comprises performing the relative movement at an uncompressed image data printing velocity.

5. The method of claim 1, wherein the spatial compression has a given ratio between compressed and uncompressed image data, and wherein the printing comprises:
   increasing the speed of the relative movement between the print medium and the printhead by the ratio.

6. The method of claim 5, wherein the printing comprises printing the compressed image data at an uncompressed image data firing frequency.

7. The method of claim 1, wherein the compressed image data is not decompressed prior to the printing.

8. The method of claim 1, wherein the spatial compression comprises decimation of the uncompressed image data in the direction of the relative movement.

9. The method of claim 8, wherein the decimation of the uncompressed image data comprises integer sub-sampling of the uncompressed image data in the direction of the relative movement.

10. The method of claim 9, wherein the sub-sampling comprises sub-sampling every other pixel of the uncompressed image data in the direction of the relative movement to compress the uncompressed image data by a 2:1 spatial compression ratio.

11. The method of claim 10, wherein the sub-sampling is performed at least twice to compress the uncompressed image data by at least a 4:1 spatial compression ratio.

12. The method of claim 1, wherein the printing prints the compressed image data using the single one of the lines of nozzles but not any other line of nozzles.

13. A printer, comprising:
   a printhead having plural spaced-apart lines of nozzles to emit a same colorant for printing on a medium;
   an interface that receives digital image data, from an external image source, that is spatially compressed in a direction of relative motion between the printhead and the medium, the lines orthogonal to the direction; and a controller that prints the compressed image data using a single one of the lines of nozzles to form a printed image which corresponds to the digital image without the spatial compression.

14. The printer of claim 13, wherein the spatial compression has a given ratio between compressed and uncompressed image data, and wherein the controller prints the compressed image data at a firing frequency that is reduced relative to an uncompressed image data firing frequency by the ratio.

15. The printer of claim 14, wherein the relative motion is performed at an uncompressed image data printing velocity.

16. The printer of claim 13, wherein the spatial compression has a given ratio between compressed and uncompressed image data, and wherein the controller increases the speed of the relative movement between the printhead and the print medium by the ratio.

17. The printer of claim 16, wherein the controller prints the compressed image data at an uncompressed image data firing frequency.

18. The printer of claim 13, wherein the controller applies a printmask that inhibits all but the single line of nozzles from printing the compressed image data.

19. The printer of claim 13, wherein the controller does not decompress the compressed image data prior to the printing.

20. A non-transitory computer-readable storage medium having an executable program stored thereon, wherein the program instructs a processor to:

receive digital image data spatially-compressed at a given compression ratio between compressed and uncompressed image data in a direction of relative movement between a print medium and a printhead, the printhead having plural spaced-apart lines of nozzles orthogonal to the direction of relative movement to emit a given colorant; and print the image data on the medium without the spatial compression by emitting the colorant from a single one of the lines of nozzles at a firing frequency that is reduced relative to an uncompressed image data firing frequency for printing uncompressed image data by the ratio.

21. The medium of claim 20, wherein the program instructs the processor to:

perform the relative movement between the print medium and the printhead at an uncompressed image data printing velocity for printing uncompressed image data.

* * * * *